UNITED STATES PATENT OFFICE 2,688,227

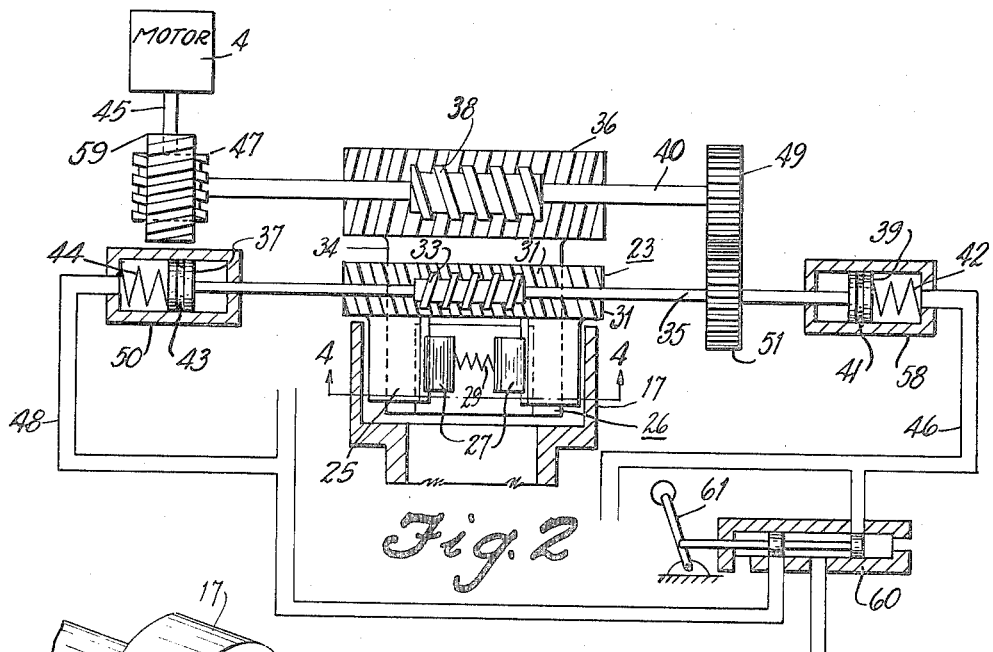
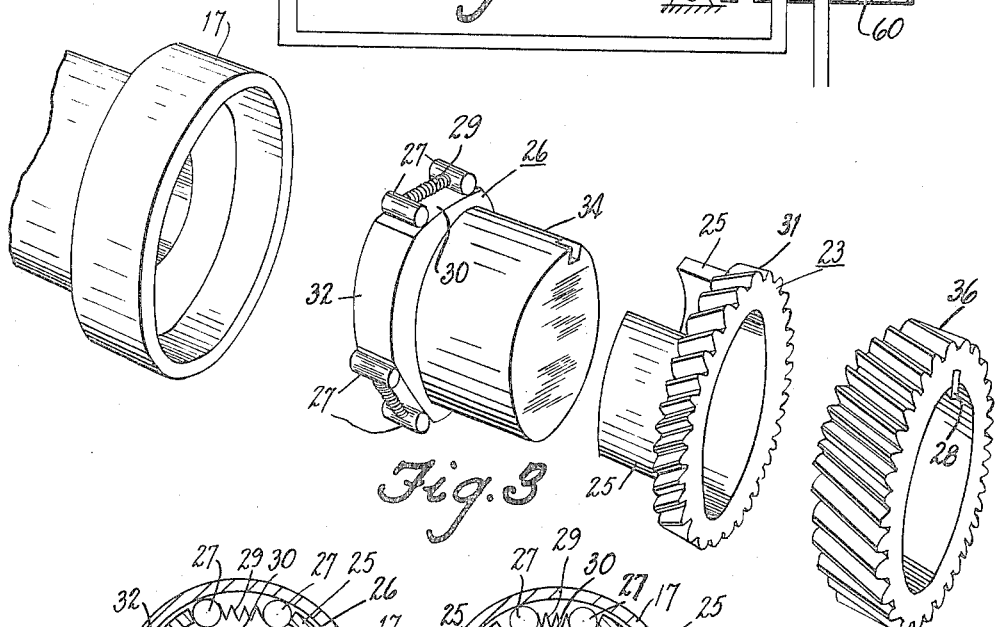
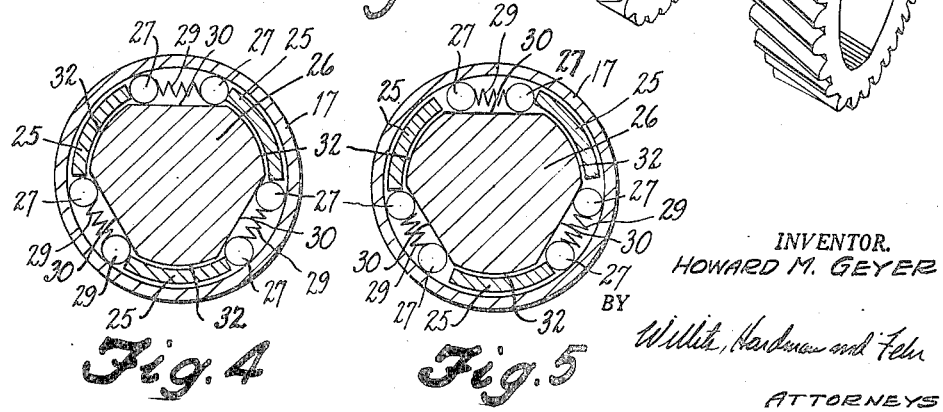

DUAL DRIVE ACTUATOR

Howard M. Geyer, Dayton, Ohio, assignor to General Motors Corporation, Detroit, Mich., a corporation of Delaware Application July 1, 1952, Serial No. 296,608

14 Claims. (Cl. 60—6)

The present invention relates to actuators and more particularly to actuators adapted to be operated by two separate motivating means.

In actuators designed for operating control surfaces of an aircraft, locking means for maintaining the movable actuator element and the load device associated therewith at a fixed position during the absence of the motivating means, are a necessity. However, the locking devices generally used with actuators are unidirectional in nature. That is, when the motivating force for operating the actuator is supplied thereto, the locking means are concurrently released. This feature is often undesirable, for instance, when the combined forces of the load device are instantaneously greater than the operating force of the motivating means, in which instance the load device tends to move in a direction opposite to that desired. Accordingly, my objects include the provision of an actuator with locking means that are bidirectional in nature, and further include the provision of primary and auxiliary motivating forces for operating an actuator of this type.

The aforementioned and other objects are accomplished in the present invention by the utilization of fluid medium under pressure as the primary motivating force, while the secondary motivating force is supplied by a reversible electric motor. The primary motivating force is normally utilized to operate the actuator, while the auxiliary motivating force is used only upon failure or inoperativeness of the primary source of power. Specifically, the actuator includes a cylinder having disposed therein a piston mounted for reciprocal movement. The piston is provided with a rod that projects through one end of the cylinder and is adapted for connection with a suitable load device. Associated with the piston is a ball screw-nut assembly of such a character that upon reciprocal movement of the piston and nut, the screw shaft will be rotated. One end of the screw shaft is formed as a locking collar, rotatably journaled by bearing means within the cylinder. Coaxially disposed within the locking collar are a cam member, a fingered lock releasing collar and a plurality of double acting clutches which together form the locking means. When fluid pressure is utilized as the motivating force for the actuator, rotation of the locking collar in one of two directions is permitted by a predetermined arcuate movement of the fingered lock releasing collar.

The lock releasing collar, rotatably journaled on an axially extending portion of the cam member, has its exterior surface formed as a worm gear. During the application of fluid pressure to the actuator cylinder, the cam member is restrained from rotation by the electric motor and its associated irreversible gear train. A worm meshes with the worm gear formed on the lock release collar and is capable of effecting arcuate movement thereof upon reciprocal movement of a combined piston rod and shaft associated with the worm. The combined piston rod and shaft is provided with pistons at opposite ends thereof, which pistons are disposed for reciprocal movement in a pair of lock release cylinders mounted transversely of the actuator cylinder. A second worm gear is keyed to the axially extending portion of the cam member, this worm gear also meshing with a second worm. The second worm is operatively connected to a drive shaft having at opposite ends a spur gear and a third worm wheel, respectively. The third worm wheel meshes with a worm associated with an electric motor driven shaft. The spur gear meshes with another spur gear that is connected with the combined piston rod and shaft. Suitable ports, passages and valve mechanism are provided to direct fluid medium under pressure to the various cylinders.

During operation by the primary motivating means, fluid pressure is directed by the valve mechanism concurrently to one of the lock release cylinders and one of the actuator cylinder chambers, whereupon the screw shaft and the locking collar will be released for rotation in one direction, permitting reciprocal movement of the actuator piston in one direction. As the several relative movable parts of the actuator are restrained from movement in the opposite direction, the load device cannot effect undesired movement of the actuator piston. If for any reason whatsoever the fluid pressure system should become inoperative, the actuator piston and load device may be adjusted by operation of the reversible electric motor. In this instance, both worm gears are rotated in the same direction and at the same speed, which rotation does not disturb the disposition of the several parts in the locking means. Consequently, rotation of the lock releasing collar and the cam member will effect rotation of the locking collar and its associated screw shaft in the same direction. Rotation of the screw shaft will, in turn, effect reciprocal movement of the piston and adjustment of the load device, dependent upon the direction of motor rotation.

Further objects and advantages of the present invention will be apparent from the following description, reference being had to the accompanying drawings wherein a preferred embodiment of the present invention is clearly shown.

In the drawings:

Fig. 2 is a diagrammatic view of the actuator locking and releasing means, and the motor driven connection for the actuator.

Fig. 3 is an exploded view, in perspective, of the locking and releasing means, and the motor driven connection.

Fig. 4 is a sectional view taken along line 4—4 of Fig. 2 with the locking means shown in the locked position.

Fig. 5 is a sectional view taken along line 4—4 of Fig. 2 with the locking means shown in the partially released position.

Figure 1:
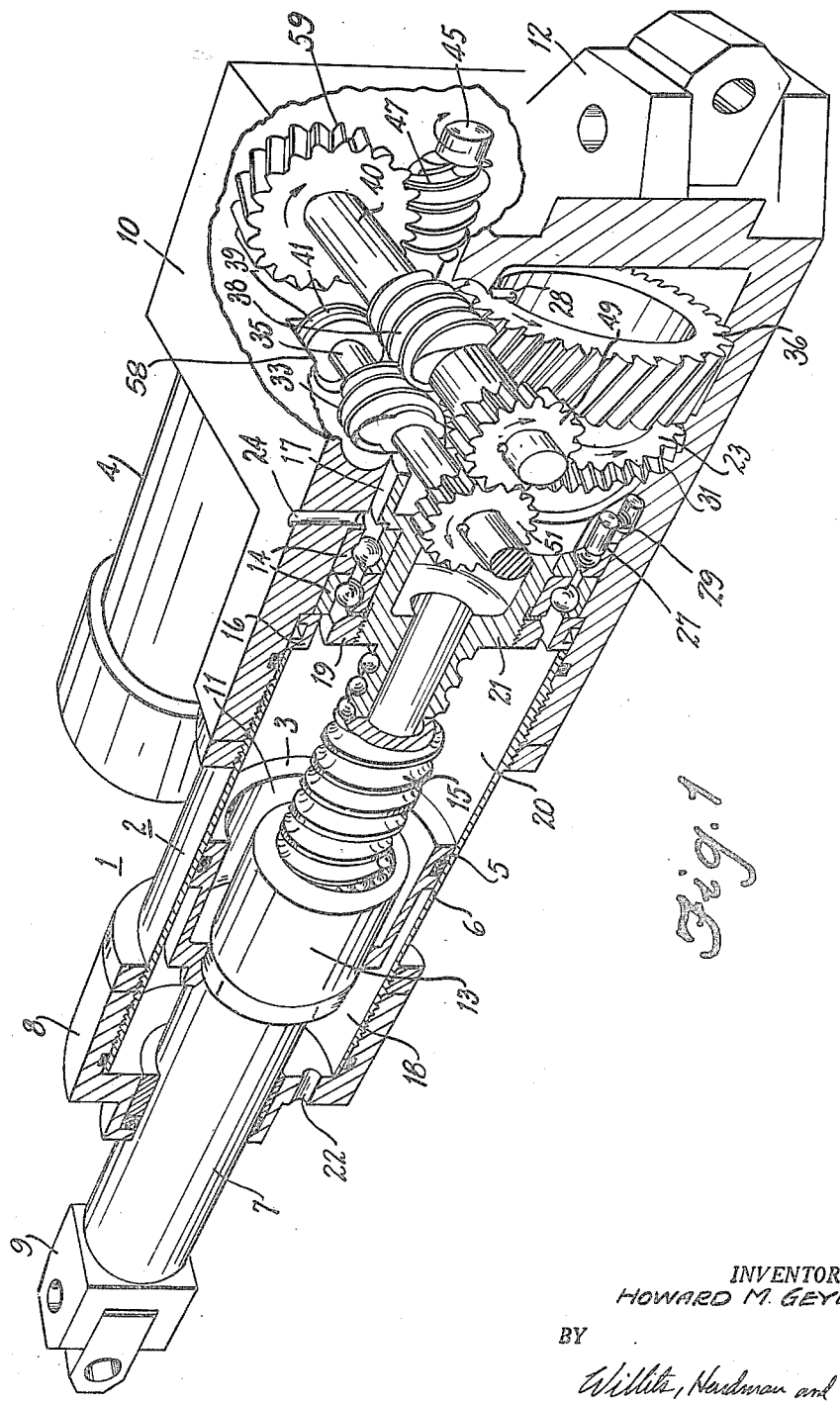
Fig. 1 is a sectional view, somewhat in perspective, of a dual drive actuator with certain of its parts removed.

Referring more particularly to Fig. 1, an actuator, designated generally by 1, is shown including a cylinder 2 having attached thereto a reversible electric motor 4 and having disposed therein a piston 3. The cylinder 2 comprises a tubular portion 6, a centrally apertured head cap member 8 and a tail cap member 10. The head cap member 8 threadedly engages one end of the tubular member 6 and is retained in position thereon by means of a locking ring. The tail cap member 10, likewise, threadedly engages the other end of tubular member 6 and is retained thereon by means of a locking ring. Suitable fluid seals are provided between the ends of the tubular member 6 and the end cap member. The piston 3 is provided with a seal 5, which insures fluid-tight connection between the circumferential surface of the piston and the inner surface of the cylinder wall defined by the tubular member 6. The piston 3 is formed integral with axially extending hollow rod 7, which extends through the aperture in the head cap 8 and is provided at its free end with a fixture 9. The fixture 9 may be attached to any suitable load device, not shown, such as an aircraft control surface. Suitable sealing means are provided between the aperture in the head cap member 8 and the projecting piston rod 7. The tail cap member 10 is provided with a fixture portion 12, which may be attached to any rigid portion of an aircraft.

Disposed within a hollowed out portion 11 of the piston 3, and anchored therein, is a nut member 13. The nut 13 is provided with an internal spiral thread, which may be of semi-circular configuration. One end of a complementary spirally threaded screw shaft 15 engages the threaded nut through the media of a plurality of balls, not shown, to provide a substantially frictionless coupling therebetween similar to that disclosed and claimed in my copending application, Serial No. 78,412, filed February 25, 1949. One end of the screw shaft 15 extends into the hollow piston rod 7 and the other end of the shaft is formed integral with an enlarged diameter tubular portion 21 and a locking collar 17. The tubular portion 21 engages the inner races of bearing means 14, which journal the screw shaft and locking collar as a unit for rotation within the cylinder 2. The inner races of the bearings 14 are maintained in engagement with a shoulder of the collar 17 by means of a ring 19, which threadedly engages one end of the portion 21. The outer races of the bearings 14 are retained in position by means of a channeled ring 16, which urges them against a radially inward extending shoulder formed on the tail cap member 10. The ring 16 is urged to the right, as viewed in Fig. 1, when the tubular member 6 is threaded into engagement with the tail cap member 10.

The piston 3 divides the cylinder 2 into a retract chamber 18 and an extend chamber 20. Retract chamber 18 communicates with a port 22 in the head cap member 8, while extend chamber 20 communicates through the bearing means 14 with a port 24 in the tail cap member 10. Suitable valve means, to be later described, are utilized to control the flow of fluid to and from the actuator cylinder chambers. Upon the application of fluid pressure to one of the actuator chambers and the coincident exposure to drain of the other actuator chamber, the piston 3 will undergo a reciprocal movement, which movement will be permitted and will effect rotative movement of the screw shaft 15, by reason of the ball-nut connection therebetween, if the locking means, to be described, has been released.

Referring particularly to Figs. 2, 3, and 4, the locking means and their operation when the primary motivating force, namely, fluid under pressure, is utilized to operate the actuator, will now be described. Coaxially disposed within the locking collar 17 is a cam member 26. The cam member 26 is normally restrained from rotation by an irreversible gear train associated with the electric motor 4 when fluid under pressure is utilized to operate the actuator. The cam member 26 is provided with three axially extending flats 30, which include an angle of at least 60°. The flats 30 are separated by arcuate surfaces 32, which surfaces are concentric with respect to the locking collar 17. The cam member 26 is also provided with a cylindrical extension 34. Rotatably mounted on the cylindrical portion 34 is a lock releasing collar 23 having three axially extending fingers 25, which are disposed coaxially between the arcuate surfaces 32 of the cam member and the lock ring 17. Mounted on each of the flats 30 is a double acting roller type clutch, which constitutes a bidirectional locking mechanism. Each of the roller locking mechanisms includes a pair of rollers 27 normally urged apart by a preloaded spring 29 so that each roller engages an edge surface of one of the fingers 25. Opposite ends of the spring 29 engage medial portions of the rollers 27. A worm wheel 36 is anchored to the cylindrical portion 34 by means of a key 28. The worm wheel 36 meshes with a worm 38 that is rigidly connected with a shaft 40. Shaft 40 is operatively connected to the motor 4 through an irreversible gear train, which will be described.

With the several elements of the locking means in the position shown in Fig. 4, relative rotation between the locking collar 17 and the cam member 26, and reciprocal movement of the piston 3 is restrained in both directions in the following manner. If the locking collar 17 tends to rotate either clockwise or counterclockwise, three of the rollers 27 will be wedged between the flats 30 and the inner circumferential surface of the locking collar 17 whereby any relative rotation therebetween is prevented. To permit relative rotation between the locking collar 17 and the cam member 26, a predetermined arcuate movement of the fingers 25 must occur. Referring to Fig. 5, fingers 25 have been moved counterclockwise, which effects movement of three of the rollers toward their mating rollers, which are restrained from movement by reason of the flats 30 and the inner circumferential surface of the locking collar 17. When one roller of each pair moves toward the other, springs 29 are compressed and the roller which is moved disengages the locking means enabling rotation of the locking collar 17 in only one direction. Thus, as is shown in Fig. 5, with the fingered element moving counterclockwise from its position in Fig. 4, the locking collar 17 is free to rotate clockwise but is restrained from rotation counterclockwise. The opposite conditions will prevail upon movement of the fingers in a clockwise direction. That is, locking collar is permitted to move counterclockwise but is restrained from clockwise direction.

The specific means for effecting arcuate movement of the lock release collar 23 and the fingers 25 will now be described when fluid pressure is used to operate the actuator, as is shown diagrammatically in Fig. 2 and structurally in Figs. 1 and 3 combined. The lock release collar 23 is provided with a worm wheel 31 on its outer circumferential surface. A worm 33 meshes with the worm wheel 31, the worm 33 being operatively connected with a combined piston rod and shaft 35. The combined piston rod and shaft has oppositely extending end portions, which are connected to piston heads 37 and 39, respectively. As is shown diagrammatically in Fig. 2, piston head 39, having an O-ring seal 41, is housed within lock release cylinder 58. Structurally, cylinder 58 is formed as an integral part of the tail cap member 10, as is shown in Fig. 1. The piston 37, having an O-ring seal 43, is disposed within a second lock release cylinder 50. The lock release cylinders extend transversely of the actuator cylinder 2. Disposed within an end wall of the cylinder 58 and the piston 39 is a preloaded spring 42. Likewise, disposed between an end wall of a cylinder 50 and the piston 37 is a preloaded spring 44. The function of the preloaded springs 42 and 44 is to maintain the lock release collar 23 and the fingers 25 in the position they are shown in Figs. 2 and 4, during the absence of fluid pressure from either of the cylinders 58 or 50. The cylinders 58 and 50 are connected by passages 46 and 48, respectively, to ports of a slide valve mechanism 60, the position of which is controlled by lever 61. Passage 46 also communicates with actuator port 22 and one port of the valve mechanism, while passage 48 communicates with actuator port 24 and a second port of the valve mechanism.

The electric motor drive, as the auxiliary motivating force, is transmitted to the actuator piston 3 as follows. As is shown structurally in Figs. 1 and 3 and diagrammatically in Fig. 2, the electric motor 4, which is of the reversible type, drives a motor shaft 45, which, in turn, drives a worm 47. The worm 47 meshes with a worm wheel 59 that is anchored to one end of the shaft 40. Intermediate the ends of shaft 40, the worm 38 is attached, which worm meshes with the worm wheel 36 that is keyed to the portion 34 of the cam member 26. The other end of the shaft 40 is provided with a spur gear 49 that meshes with a second spur gear 51 that is anchored to the combined piston rod and shaft 35, between the worm 33 and the lock release cylinder 58. The gear train from the motor 4 to the worm wheel 36 is irreversible in nature. That is, movement cannot be transmitted from the worm wheel 36 to the motor shaft 45. Consequently, during deenergization of the motor 4, worm wheel 36 and cam member 26 will be held in a fixed position. When the fluid pressure system is inoperative and actuator movements are desired through the auxiliary motivating force, namely the electric motor 4, movement of the actuator piston 3 is effected as follows. Rotation of the shaft 45 in a clockwise direction, as viewed in Fig. 1, will also effect rotation of worm wheel 59 in the clockwise direction. Clockwise direction of worm wheel 59, shaft 40 and worm 38 will effect counterclockwise rotation of worm wheel 36, which will, in turn, effect counterclockwise rotation of cam member 26. Through the spur gears 49 and 51, combined piston rod and shaft 35 will be rotated in a counterclockwise direction, which through worm 33 will effect counterclockwise rotation of worm wheel 31 and lock release collar 23. Accordingly, the disposition of the several parts of the locking means will not be disturbed and will remain in the position they are shown in Figs. 2 and 4.

*Operation*

When the valve mechanism is actuated to effect the application of hydraulic fluid medium under pressure to the retract chamber 18 of the actuator, fluid under pressure is simultaneously transmitted via passage 46 to the lock release cylinder 58. As a result, the piston 41 and the rod 35 will be moved to the left, as viewed in Fig. 2, which movement is allowed by reason of the straight teeth on the spur gears 49 and 51. Movement of rod 35 and its associated worm 33 to the left will effect a counterclockwise movement of the lock release collar 23 and the fingers 25 to the position they are shown in Fig. 5. In this instance, the bidirectional locking means are partially released to allow clockwise rotation of the locking collar 17. Accordingly, the fluid pressure directed to retract chamber 18 and the concurrent exposure to drain of chamber 20 will effect reciprocal movement of the piston 3 to the right, as viewed in Fig. 1. By reason of the ball screw-nut connected between the piston 3 and the screw shaft 15, the screw shaft will rotate clockwise as permitted between partially released locking means. When the desired movement of the load device, operatively connected to the fixture 9 of the rod 7, has been effected, movement of the control valve mechanism to the neutral position will effect a repositioning of the several elements of the locking mechanism to the position they are shown in Figs. 2 and 4. When it is desired to extend the load device associated with the piston rod 7, the valve mechanism is moved in the opposite direction causing concurrent application of the fluid pressure to the extend chamber 20 and to the lock release chamber 40. In this instance, rotation of the lock release collar 17 will be permitted in a counterclockwise direction but will be restrained in a clockwise direction and the piston 3 may be moved to the left, as viewed in Fig. 1. In this manner the actuator may be operated by the primary motivating force, namely, fluid under pressure. Moreover, by reason of the locking means preventing rotation of the locking collar 17 in the direction opposite to that which piston movement is selected, should the combined forces of the load exceed that of the pressure in one of the actuator chambers, uncontrolled movements of the load device are prevented.

If the fluid pressure system should become inoperative for any reason, adjustments of the load device may be accomplished by operation of the reversible electric motor 4. In this instance, and dependent upon the direction of motor rotation selected, the actuator may either be extended or retracted in the following manner. As aforedescribed, rotation of the motor shaft 45 will effect rotation of worm wheel 36 and worm wheel 31 in the same direction and at the same speed. Consequently, the disposition of the locking means will remain in the position they are shown in Fig. 4. Accordingly, if the fingers 25 and the cam member 26 are driven in a counterclockwise direction, as viewed in Fig. 4, the locking collar 17 will likewise be driven in a counterclockwise direction through one roller of each of the sets, by reason of the wedging action of the rollers between the flats 30 and the inner circumferential surface of the locking collar. Rotation of locking collar 17 in the clockwise direction will effect rotation of the screw shaft 15 in a like direction. Rotation of the screw shaft 15 through the media of the balls, not shown, and the nut 13 will effect reciprocal movement of the piston 13 to the right, as viewed in Fig. 1. Likewise, clockwise rotation of the fingers 25 and the cam 26 will effect movement of the piston 3 to the left, as viewed in Fig. 1. It is also apparent that when the electric motor is driving the piston 3 in one direction, the load device associated therewith cannot effect uncontrolled movements of the piston by reason of the irreversible gear train constituting the driving means between the motor and the locking collar 17.

While the embodiment of the present invention as herein disclosed, constitutes a preferred form, it is to be understood that other forms might be adopted.

What is claimed is as follows:

1. A dual drive actuator including in combination, a cylinder, a piston disposed in said cylinder and mounted for reciprocal movement therein under the urge of fluid pressure, an element rotatably journaled in said cylinder and operatively connected with said piston whereby reciprocal movement thereof effects rotative movement of said element, means operatively connecting said piston to a load device, means associated with said rotatable element for preventing movement thereof by said load device under all conditions, means operative concurrently with the application of fluid pressure to said cylinder for releasing said second recited means to permit movement of said load device only through movement of said piston and said rotatable element, and auxiliary means operatively connected with said second recited means for normally maintaining the same operative, said auxiliary means in addition being operative for effecting rotative movement of said element and consequent reciprocal movement of said piston through said second recited means in lieu of fluid pressure operation.

2. The combination set forth in claim 1 wherein said second recited means includes a bidirectional locking mechanism, and wherein said auxiliary means comprises a reversible electric motor.

3. The combination set forth in claim 2 wherein said second recited means includes a locking collar attached to said rotatable element, a cam member coaxially disposed within said locking collar and restrained from rotation during deenergization of said electric motor, and a plurality of roller-lock mechanism associated with said cam member.

4. The combination set forth in claim 1 wherein the operative connection between said auxiliary means and said second recited means includes an irreversible gear train whereby the said second recited means may be driven by said auxiliary means but cannot drive the same.

5. A dual drive actuator comprising a cylinder, the reciprocable member disposed therein, an element rotatably journaled in said cylinder and operatively connected with said reciprocable member whereby reciprocal movement thereof effects rotative movement of said element, bidirectional locking means operatively associated with said rotatable element for preventing movement thereof and consequent reciprocal movement of said member, primary motivating means effective on said member and concurrently effective to partially release said bidirectional locking means to permit unidirectional movement of said member, and auxiliary motivating means associated with said bidirectional locking means for normally maintaining the same operative, said auxiliary means in addition being operative to effect rotative movement of said element and consequent reciprocal movement of said member through said bidirectional locking means when said primary motivating means is rendered inoperative.

6. A dual drive actuator including in combination, a cylinder, a reciprocable piston disposed in said cylinder capable of fluid pressure actuation in either direction, releasable locking means operatively associated with said piston for preventing movement of said piston when no fluid pressure is exerted thereon, said locking means being bidirectional in nature so that when released, piston movement under the urge of fluid pressure is permitted in either of, but not both directions, at any one time, and auxiliary driving means operatively connected to said piston for effecting reciprocable movement thereof in either direction with the locking means in the locked condition.

7. A dual drive actuator including in combination, a cylinder, a reciprocable piston disposed in said cylinder capable of fluid pressure actuation in either direction, a rotatable element disposed in said cylinder and operatively connected with said piston such that said element will rotate in response to movement of said piston, releasable locking means operatively associated with said rotatable element for preventing movement thereof and consequent reciprocable movement of said piston in the absence of fluid pressure application to said cylinder, said locking means being bidirectional in nature so that when released, piston movement in either of, but not both directions, is permitted at any one time, and auxiliary means operatively associated with said rotatable element through said locking means for effecting rotation of said element in either direction with the locking means in the locked condition so as to effect reciprocation of said piston in lieu of fluid pressure actuation.

8. A dual drive actuator including in combination, a cylinder, a reciprocable piston disposed in said cylinder capable of fluid pressure actuation in either direction, a first element disposed in said cylinder and operatively connected to said piston, a second element operatively engaging said first element, said first and second elements being adapted for rotation relative to each other upon movement of said piston, releasable locking means operatively associated with said piston for normally preventing movement thereof in the absence of fluid pressure application to said cylinder, said locking means being bidirectional in nature so that when released, piston movement in either of, but not both directions, is permitted at any one time, and auxiliary means operatively associated with said elements for effecting relative rotation therebetween to effect reciprocable movement of said piston in lieu of fluid pressure actuation with the locking means in the locked condition.

9. A dual drive actuator including in combination, a cylinder, a reciprocable piston disposed in said cylinder capable of fluid pressure actuation in either direction, a first element disposed in said cylinder and operatively connected to said piston, a second element operatively engaging said first element, said first and second elements being adapted for rotation relative to each other upon movement of said piston, releasable locking means operatively associated with said piston for preventing movement thereof in the absence of fluid pressure application to said cylinder, said locking means being bidirectional in nature, and auxiliary driving means operatively connected to said piston through said elements for effecting reciprocable movement of said piston, said auxiliary means, when inactive, maintaining said locking means operative and, when active, operative to rotate one of said elements with the locking means in the locked condition.

10. A dual drive actuator including in combination, a cylinder having a reciprocable piston disposed therein capable of fluid pressure actuation in either direction, releasable locking means operatively associated with said piston for normally preventing movement thereof in the absence of fluid pressure application to said cylinder, said locking means being bidirectional in nature, and auxiliary driving means operatively connected to said piston for effecting reciprocable movement thereof in lieu of fluid pressure actuation, the operative connection between said piston and said auxiliary means including a hollow element constrained for movement with said piston, the said locking means in the locked condition, and an element rotatably supported in said cylinder and having operative engagement with said hollow element whereby relative rotation will occur between said elements upon movement of said piston, said driving means, when inactive, maintaining said locking means operative to prevent piston movement and, when active, operative to rotate said rotatable element.

11. A dual drive actuator including in combination, a cylinder having a lineally movable piston disposed therein capable of fluid pressure actuation in either direction, releasable locking means operatively associated with said piston for preventing movement thereof when no fluid pressure is exerted thereon, and auxiliary driving means operatively connected to said piston for effecting linear movement thereof in either direction in lieu of fluid pressure actuation, the operative connection between said piston and said auxiliary means including a first element disposed in said cylinder for rotation relative to said piston, the said locking means in the locked condition, and a second element constrained for linear movement with said piston and operatively engaging said first element whereby relative rotation will occur between said elements upon linear movement of said piston.

12. An actuator assembly including in combination, a cylinder, a reciprocable piston disposed in said cylinder, a first element rotatably journaled in said cylinder and normally restrained against rotation, said first element being operatively connected to said piston, the operative connection between said piston and said first element including a second element constrained for movement with said piston, said first and second elements having operative engagement whereby relative rotation will occur between said elements in response to reciprocable movement of said piston, and releasable locking means operatively associated with said first element for restraining rotation of the said first element and, consequently, preventing reciprocable movement of said piston when the actuator is inactive.

13. An actuator assembly including in combination, a cylinder, a reciprocable piston disposed in said cylinder, a first element rotatably journaled in said cylinder, said first element being operatively connected to said piston, the operative connection between said piston and said first element including a second non-rotatable element constrained for movement with said piston, said first and second elements having operative engagement whereby relative rotation will occur between the said elements in response to piston movement, and releasable locking means operatively associated with said first element for restraining rotation of the said first element, and consequently, preventing movement of said piston when the actuator is inactive, said locking means being bidirectional in nature so that when released, piston movement in either of, but not both directions, is permitted at any one time.

14. A dual drive actuator including in combination, a cylinder, a reciprocable piston disposed in said cylinder capable of fluid pressure actuation in either direction, a first fixture attached to said piston and projecting through one end wall of said cylinder, a second fixture attached to the other end wall of said cylinder, one of said fixtures being constructed and arranged for connection to a relatively fixed support, the other of said fixtures being constructed and arranged for connection to a relatively movable load device whereby relative movement between said piston and said cylinder will effect adjustment of said load device, releasable locking means disposed in said cylinder and operatively associated with said piston for normally preventing movement thereof in the absence of fluid pressure application to said cylinder, said locking means being bidirectional in nature so that when released, piston movement in either of, but not both directions, is permitted at any one time, and auxiliary driving means operatively associated with said piston for effecting reciprocable movement of said piston in lieu of fluid pressure actuation with the locking means in the locked condition.

References Cited in the file of this patent

UNITED STATES PATENTS

| Number | Name | Date |
|---|---|---|
| 2,394,384 | Horstmann | Feb. 5, 1946 |
| 2,476,376 | Laraque | July 19, 1949 |

FOREIGN PATENTS

| Number | Country | Date |
|---|---|---|
| 443,871 | Great Britain | Mar. 5, 1936 |